Nov. 22, 1927.
A. GRUICH
TYPEWRITER CARRIAGE RETURN MECHANISM
Filed Nov. 22, 1926
1,650,443
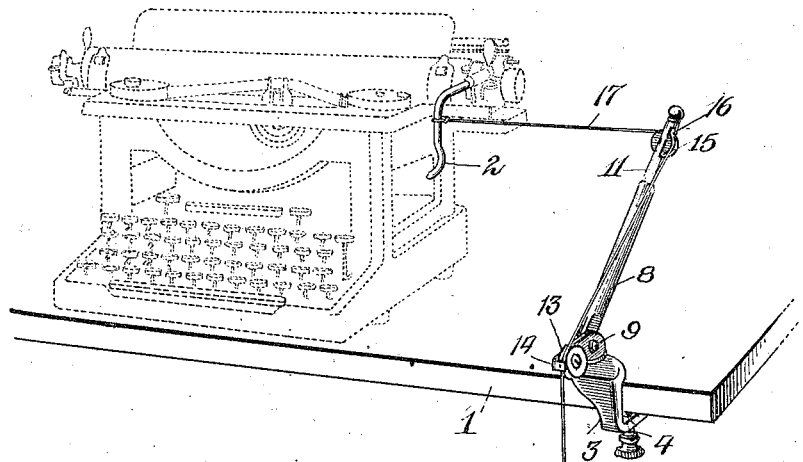
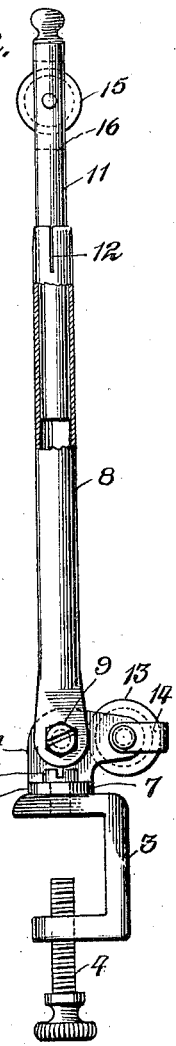
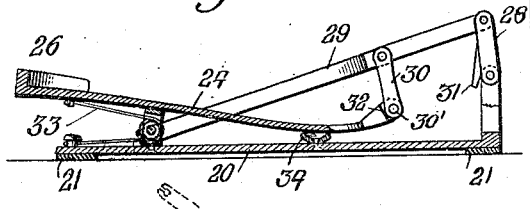
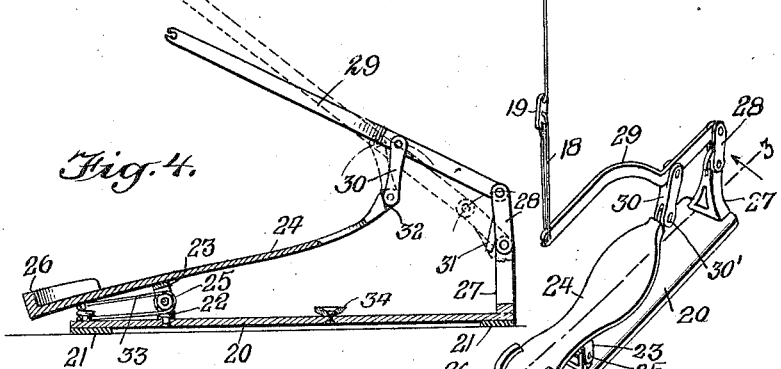
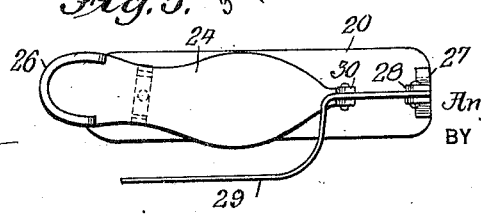
WITNESSES
INVENTOR
Antonije Gruich
BY
Munn & Co.
ATTORNEY Patented Nov. 22, 1927.

1,650,443

UNITED STATES PATENT OFFICE.

ANTONIJE GRUICH, OF NEW YORK, N. Y.

TYPEWRITER-CARRIAGE-RETURN MECHANISM.

Application filed November 22, 1926. Serial No. 150,106.

This invention relates to typewriter carriage return mechanisms, an object of the invention being to provide an improved mechanical movement embodying a foot pedal, and improved arrangement of linkage whereby a maximum of movement is permitted the linkage with a minimum movement of the foot pedal.

While I shall describe my invention as a means for returning the carriage of a typewriter to starting position I would have it distinctly understood that the mechanism is capable of a wide range of utility in connection with any other suitable mechanism which is now operated by hand so that the operator can perform the operation by movement of the foot, leaving both hands free for other uses.

A further object is to provide a device or mechanism of this character which can be manufactured and sold at a reasonably low price, which will be neat and attractive in appearance, and which will most efficiently perform the functions for which it is intended.

With these and other objects in view, the invention consists in certain novel features of construction and combinations and arrangements of parts, which will be more fully hereinafter described and pointed out in the claims.

In the accompanying drawings—

Figure 1 is a perspective view illustrating my improved mechanism operatively connected to the shift lever of a typewriter carriage;

Figure 2 is a view mainly in elevation but partly in section showing my improved pulley-supporting adjustable post;

Figure 3 is a view in longitudinal section showing my improved foot-operated pedal and co-operating mechanism in one extreme position;

Figure 4 is a view similar to Figure 3, showing in full and dotted lines other positions of the parts;

Figure 5 is a plan view showing the lever in a position reverse to that shown in Figure 1.

1 represents a table or other support, and 2 the shift lever of a typewriter carriage, although it is to be distinctly understood that this member 2 may constitute a member of other movable mechanisms which are commonly operated by hand.

To the table or support 1 I secure a U-clamp 3, preferably by means of a set screw 4 located in one member of the clamp and engaging the bottom of the table 1. On this U-clamp 3 a bracket 4 is secured by means of a screw 5 which projects through a perforated base 6 on the bracket and is screwed into the clamp 3. A washer 7 is preferably interposed between the head of the screw 5 and the clamp, and this screw permits the bracket to be turned to any desired angle and clamped rigidly in any position.

A tubular post 8 is pivotally connected at its lower end to the bracket 4 by means of a screw bolt 9 so that this post may be swung at any desired angle relative to the bracket. A post extension 11 telescopes in the upper end of the post 8, and said post 8 is longitudinally slit at its upper end, as shown at 12, so that it constitutes a spring gripping member to hold the extension 11 in any position of longitudinal adjustment.

The bracket 4 above described supports a pulley 13 with a guard 14 over the same, and the post extension 11 supports a pulley 15 near its upper end, said pulley being preferably located in a slot 16 in said post extension. An operating cord or other flexible connecting device 17 is secured at one end to the shift lever 2 to pass through the slot 16, over the pulley 15 and thence over the pulley 13 within the guard 14. The lower end of this cord is preferably looped, as shown at 18, with an adjusting slide 19 thereon to adjust the length of the cord to suit conditions, and said cord at its looped end is operatively connected to my improved foot pedal operating mechanism, which will now be described.

20 represents a base which may be provided with cushion members 21 to engage the floor and prevent slipping of the base and also prevent scratching or injury to the floor. On this base 20, adjacent one end thereof, a bifurcated bracket 22 is fixed, and a bifurcated bracket 23 fixed to the under face of a foot pedal 24 is pivotally connected to said bracket 22 by means of a pin 25.

This foot pedal 24 preferably conforms in shape to the shape of the sole of the foot, and the point of pivotal connection thereof is located nearer the heel portion of the pedal than the toe portion, and said heel portion is preferably formed with an upwardly projecting flange 26 which acts to prevent the foot or shoe from slipping off the pedal.

A post 27 is fixed to one end of the base 20, and a link 28 is pivotally connected to the upper end of the post 27. A lever 29 is pivotally connected at one end to the link 28, and said lever 29 is pivotally connected intermediate its ends to a link 30, the latter being pivotally connected to the toe end of the foot pedal 24, as shown at 30'.

The links 28 and 30 are preferably of the bifurcated type although it is of course not essential to my invention. However, it is essential that some means be provided for limiting the pivotal movements of the respective links 28 and 30, and I have shown a projection 31 on the link 28 which is adapted to engage the fixed post 27 when said link 28 is swung to an extreme position, such as illustrated in Figure 4. The other link 30 is limited in its pivotal movement by its engagement with a wall 32 constituting a part or end of the foot pedal 24.

The lever 29 adjacent its free end is preferably offset laterally so that its free end will lie in a plane to one side of the foot pedal 24 and will not interfere with the free movement of the foot, and this lever 29 may be located either at the left side of the foot pedal, as shown in Figure 1, or be reversed and located at the right side of the pedal, as shown in Figure 5, so that this mechanism is capable of adjustment or variation in form as to adapt it for the particular work it has to do.

A spring 33 is located under the heel portion of the pedal 24, and this spring may take the form of a coil around the pin 25 with the ends of the spring connected to or engaging the base 20 and the pedal, respectively, as illustrated in the drawings; or any other form of spring may be used, the purpose of which is merely to assist the pedal in its movement in one direction and release the muscles of the operator's foot and leg, and in a very real sense balance the movement so as to make it easy for the operator. A cushion 34 is preferably secured to the base 20 and adapted to be engaged by the toe end of the pedal 24 to cushion the pedal when it reaches its downward extreme position and prevent noise and jar.

By reason of the construction above described I secure an augmented movement for the lever 29 with a minimum of movement necessary for the pedal 24 to control the operation. To make this clear, I would call attention to the fact that the carriage of a typewriter moves a distance of ten inches to a foot and if this return movement were to be accomplished by a pedal requiring a like movement it would require an excessive movement of the foot and leg which would be tiresome and awkward, and with my improved mechanism I overcome this difficulty, as will now be explained.

Figures 1 and 4 illustrate what may be termed a normal position of the parts, so that when the carriage begins to move to the left there will be some slack in the cord 17, and, as the cord becomes taut and when the carriage is approaching the extreme of its movement, said movement of the carriage will remove the parts to the dotted line position indicated in Figure 4. In other words, an upward pull on the free end of lever 29 will draw apart the ends of the links 28 and 30 to the left of Figure 4 and give to lever 29 an angular disposition which will allow for the movement in carriage.

This movement is limited by the engagement of the links 28 and 30 with the parts supporting them, or to which they are connected, so as to prevent the movement of the links beyond a point where they would collapse the linkage. When it is desired to return the carriage to the starting point the operator presses downwardly on the toe end of the pedal, bringing the parts to the position indicated in Figure 3, this movement being assisted by the spring 33. The operator then presses downwardly on the heel portion of the pedal, bringing the parts to the full line position indicated in Figure 4, ready for a repeating of the operation.

While I have illustrated what I believe to be a preferred embodiment of my invention, it is obvious that various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. A foot pedal mechanism of the character described, including a base, a foot pedal on the base, a link connected to the base, a lever connected at one end to the link, and a second link connecting the lever intermediate its ends with one end of the foot pedal.

2. A foot pedal mechanism of the character described, including a base, a foot pedal on the base, a link connected to the base, a lever connected at one end to the link, a second link connecting the lever intermediate its ends with one end of the foot pedal, and means limiting the pivotal movement of the links in one direction.

3. A mechanism of the character described, comprising a base, a foot pedal pivotally supported between its ends on the base, a post on one end of the base, a link pivotally connected to the upper end of the post, a lever pivotally connected to the link and projecting in a direction toward the foot pedal but laterally offset therefrom, and a link pivotally connecting the toe end of the foot pedal with the lever intermediate the ends of the latter.

4. A mechanism of the character described, comprising a base, a foot pedal pivotally supported between its ends on the base, a post on one end of the base, a link pivotally connected to the upper end of the post, a lever pivotally connected to the link and projecting in a direction toward the foot pedal but laterally offset therefrom, a link pivotally connecting the toe end of the foot pedal with the lever intermediate the ends of the latter, and means on the first-mentioned link adapted to engage the post and limit the pivotal movement of said link toward the foot pedal.

5. A mechanism of the character described, comprising a base, a foot pedal pivotally supported between its ends on the base, a post on one end of the base, a link pivotally connected to the upper end of the post, a lever pivotally connected to the link and projecting in a direction toward the foot pedal but laterally offset therefrom, a link pivotally connecting the toe end of the foot pedal with the lever intermediate the ends of the latter, a spring exerting upward pressure on the heel end of the foot pedal, and a guard around the heel end of the pedal adapted to receive therein the heel of a shoe.

6. In combination, a post having a telescoping section, a clamp adapted to engage a support, a bracket pivotally and adjustably secured to the clamp and supporting said post, pulleys on the bracket and on the post, a foot pedal mechanism including a lever moved by a pedal, a flexible device connected to the lever and adapted to be passed over said pulleys and operatively connected to a movable member, and means constituting a part of the foot pedal mechanism permitting movement of the lever in excess of the movement imparted thereto by the foot pedal.

7. A foot pedal mechanism, including a base, a foot pedal pivotally mounted on the base, a link pivotally connected to the base, a lever pivotally connected to the link, and a second link pivotally connecting one end of the foot pedal with the lever at a point intermediate the ends of the latter, and said link so arranged as to permit an additional movement of the lever beyond any movement which may be imparted thereto by the foot pedal.

ANTONIJE GRUICH.